(12) United States Patent
Jacobs et al.

(10) Patent No.: US 8,894,847 B2
(45) Date of Patent: Nov. 25, 2014

(54) ADAPTING MULTIPURPOSE LIQUID FILTER

(75) Inventors: William A Jacobs, Lake Worth, FL (US); Michael K Tam, Lake Worth, FL (US); Brian Jacobs, Lake Worth, FL (US)

(73) Assignee: Puradyn Filter Technologies, Inc., Boynton Beach, FL (US)

(\*) Notice: Subject to any disclaimer, the term of this patent is extended or adjusted under 35 U.S.C. 154(b) by 859 days.

(21) Appl. No.: 13/108,930

(22) Filed: May 16, 2011

(65) Prior Publication Data

US 2012/0292236 A1 Nov. 22, 2012

(51) Int. Cl.
| | |
|---|---|
| *B01D 29/52* | (2006.01) |
| *B01D 35/06* | (2006.01) |
| *B01D 29/60* | (2006.01) |
| *B01D 35/147* | (2006.01) |
| *B01D 35/30* | (2006.01) |
| *B01D 37/02* | (2006.01) |

(52) U.S. Cl.
CPC ............ *B01D 35/06* (2013.01); *B01D 29/52* (2013.01); *B01D 29/60* (2013.01); *B01D 35/147* (2013.01); *B01D 35/30* (2013.01); *B01D 37/025* (2013.01); *B01D 2201/208* (2013.01); *B01D 2201/291* (2013.01)
USPC ...... 210/96.1; 210/341; 210/345; 210/167.04; 210/167.05; 210/323.1

(58) Field of Classification Search
CPC ............................................ F01M 2001/1057
USPC ................................ 210/345, 167.04, 167.05
See application file for complete search history.

(56) References Cited

U.S. PATENT DOCUMENTS

| | | | | |
|---|---|---|---|---|
| 420,136 | A * | 1/1890 | Willis | 210/323.2 |
| 4,289,583 | A | 9/1981 | Engel | |
| 4,419,234 | A | 12/1983 | Miller | |
| 5,505,842 | A * | 4/1996 | Enderle | 210/93 |
| 6,139,725 | A | 10/2000 | Barr | |
| 6,334,950 | B1 * | 1/2002 | Bogacki et al. | 210/97 |

FOREIGN PATENT DOCUMENTS

KR    10-0894897    4/2009

\* cited by examiner

*Primary Examiner* — Terry Cecil
(74) *Attorney, Agent, or Firm* — Allen D. Hertz, P.A.; Allen D. Hertz

(57) ABSTRACT

A liquid reclamation assembly is provided for processing a lubricant or other liquid. The assembly includes a housing interior for receiving a filter subassembly. A manifold is in fluid communication with a discharge region of the filter subassembly, the manifold comprising a primary manifold passage for passage of source fluid and a series of draw ports. The cross sectional area of the primary manifold passage is greater than the total cross sectional area of the series of draw ports to create a venturi effect to draw fluid through the assembly. The filter subassembly includes a series of target filtration segment, each segment being designed for a specific reclamation process. An entry manifold governs and distributes the fluid to each of the target filtration segments. Results of an analysis of the fluid can be used to determine which target filtration segments are desired for processing the fluid. Valves within the entry manifold can direct the flow accordingly.

18 Claims, 9 Drawing Sheets

ADAPTING MULTIPURPOSE LIQUID FILTER

BACKGROUND OF THE INVENTION

1. Field of the Invention

The present invention relates to an oil reclamation system and more specifically to an oil purification system incorporating a plurality of differing reclamation mediums in an adapting configuration where the system can modify, control, and direct the flow of the liquid between the different reclamation mediums.

2. Discussion of the Related Art

This invention relates to fluid reclamation and purification devices, which are preferably used in conjunction with engines using lubricating oils or hydraulic systems. More particularly, the present invention provides several unique oil/lubricant treatment means creating an unique system for reconditioning.

A majority of the fluid reclamation devices utilise a filtration assembly integrated into a single filter housing. Fluid flows into the housing, through the filtration assembly, and exits the housing. If the single filter were to become ineffective, the quality of the lubricant rapidly declines.

Oil filters are provided in a variety of form factors and materials. Common filters comprise a filtering medium disposed within a canister and sealed via a top member. A mechanical interface, such as a threaded interface, and fluid transfer means, such as an oil inlet port and an oil discharge port, are integrated into the top member. The filtering materials can be a paper product, a synthetic filtering material, and the like. The filter is designed whereby the fluid flows in through a series of orifices provided about a perimeter of a fluid passage surface, through the filtration medium(s), and redirected exiting through a fluid discharge port centrally located through the fluid passage surface.

Oil reclamation devices can additionally include soluble oil additives for enriching the oil over a period of time. The additives are positioned within the filter in a section between the particle filtering material and a felt pad. The additives are placed to contact the oil and formulated to dissolve over a period of time.

Filters are known to include a plurality of filters within the filter enclosure. One such example is taught by Miller, et al. (U.S. Pat. No. 4,419,234), wherein the filter comprises a series of filter cartridges. Each filter cartridge comprises an inlet flow port at a first end and an exit flow port located at the opposite end of the filter cartridge. The service person needs to temporarily bypass or halt the fluid flow through the entire filter in order to change any or all of the cartridges. The filter comprises a single inlet port and a single exit port. The device further has no means for selectively controlling flow through any of the filter cartridges.

Filters utilize a single flow path to ensure the fluid passes serially through each of the sections within a filter. The continued flow through the entire filter dictates a finite lifespan for the filter assembly. Filters having multiple sections may require replacement, even though it would be premature for replacement of one or more of the sections within a filter.

Fluid reclamation systems rely upon the fluid pressure for pushing the fluid through the filter assembly. Should the system pressure become reduced, the filtration process can become ineffective.

Thus, what is desired is a lubrication reclamation system providing an optimizing fluid reclamation process while maximizing a lifespan of a filter or each independent component of a fluid reclamation assembly.

SUMMARY OF THE INVENTION

The present invention is directed to a lubricant reclamation system comprising a liquid reclamation assembly. The liquid reclamation assembly includes a filtering distribution manifold subassembly, which selectively directs the subject liquid into a desired target liquid processing segment integrated into a filter subassembly.

In a first aspect of the present invention, a lubricant reclamation system comprising:
 a filter housing subassembly, the filter housing subassembly including:
  a filter housing defined by a tubular wall having a base end and an access end and a housing base being contiguous about the wall base end,
  a filter inlet port providing fluid communication into an interior portion of the filter enclosure,
  a filter discharge port providing fluid communication from an interior portion of the filter enclosure,
  a filter compartment seal providing a seal to enclose at least a portion of the filter enclosure; and
 a filtering distribution manifold subassembly, the filtering distribution manifold subassembly including:
  a distribution manifold body, the distribution manifold body comprising an distribution manifold passage passing therethrough and in fluid communication with a filter inlet port,
  a plurality of distribution conduits, each distribution conduit providing fluid communication from the distribution manifold body to a target filtration segment of a filter subassembly.

While another aspect of the present invention introduces a manifold subassembly. The manifold subassembly comprises a primary manifold passage and at least one draw conduit, wherein the draw conduit provides fluid communication between the filter discharge port and the primary manifold passage, wherein fluid passing through the primary manifold passage draws fluid from the housing interior.

Yet in another aspect, the manifold subassembly includes a fluid analysis delivery orifice, wherein the fluid analysis delivery orifice is in fluid communication with the at least one draw conduit, respectively.

Wherein another aspect, the primary manifold passage has a greater cross sectional area compared to the total cross sectional area of the at least one draw conduit resulting in a venturi effect to draw fluid from the housing interior.

In another aspect, the filtering distribution manifold subassembly further comprises a flow controlling actuator for controlling and directing flow of the subject lubricant to each of the target filtration segments.

Another aspect integrates the filtering distribution manifold subassembly within the housing base.

While another aspect, a filter subassembly comprises a plurality of independent target filtration segments. Each target filtration segment can include at least one of:
 a. a lubricant additive,
 b. a moisture removal material,
 c. a pressure treatment mechanism,
 d. a filtering mechanism for removal of magnetic material,
 e. an ionic filtering mechanism, and
 f. a particulate matter filtering mechanism.

Yet another aspect, the filter subassembly comprises a general filter material, wherein the lubricant flow path through the filter is designed to direct all of the lubricant through the general filter material.

With yet another aspect, the liquid reclamation assembly further comprises a fluid analysis system, the fluid analysis system being in fluid communication with each of a plurality of draw conduits. Each draw conduit may be in fluid communication with a distinct testing feature of the fluid analysis system, respectively.

And another aspect, the fluid analysis system can determine which of the target filtration segments are desired to process the lubricant. The system would direct the lubricant to flow into the desired target filtration segments and block the fluid from the unnecessary target filtration segments, thus optimizing the life of the filter.

While another aspect provides a fluid transfer interface member enhancing a transfer of fluid from the inlet manifold subassembly to the filter subassembly. The preferred fluid transfer interface member has a conical shape and would be inserted into a flexible gasket member provided in a base section of the filter assembly.

Yet another aspect the filter subassembly is removably inserted into an interior section of the filter housing subassembly. The preferred insertion would be provided through a removable cover. The filter housing subassembly would be fluidly sealed within the interior section of the filter housing subassembly by a filter compartment seal.

These and other features, aspects, and advantages of the invention will be further understood and appreciated by those skilled in the art by reference to the following written specification, claims and appended drawings, which follow.

BRIEF DESCRIPTION OF THE DRAWINGS

For a fuller understanding of the nature of the present invention, reference should be made to the accompanying drawings in which.

Like reference numerals refer to like parts throughout the several views of the drawings.

DETAILED DESCRIPTION OF REPRESENTATIVE EMBODIMENTS

Figure 1:
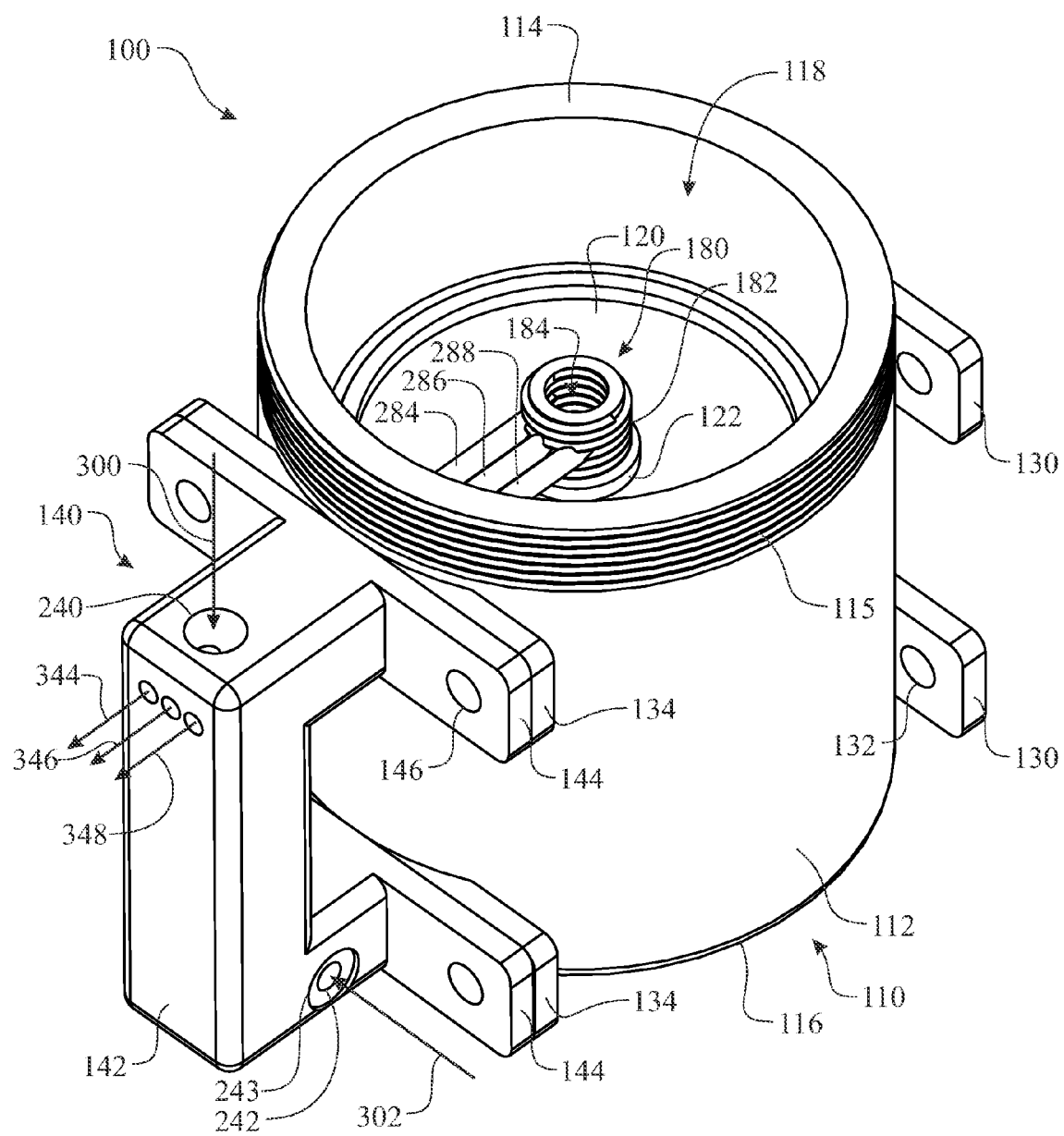
FIG. 1 presents an isometric view of an exemplary liquid reclamation assembly.
Figure 2:
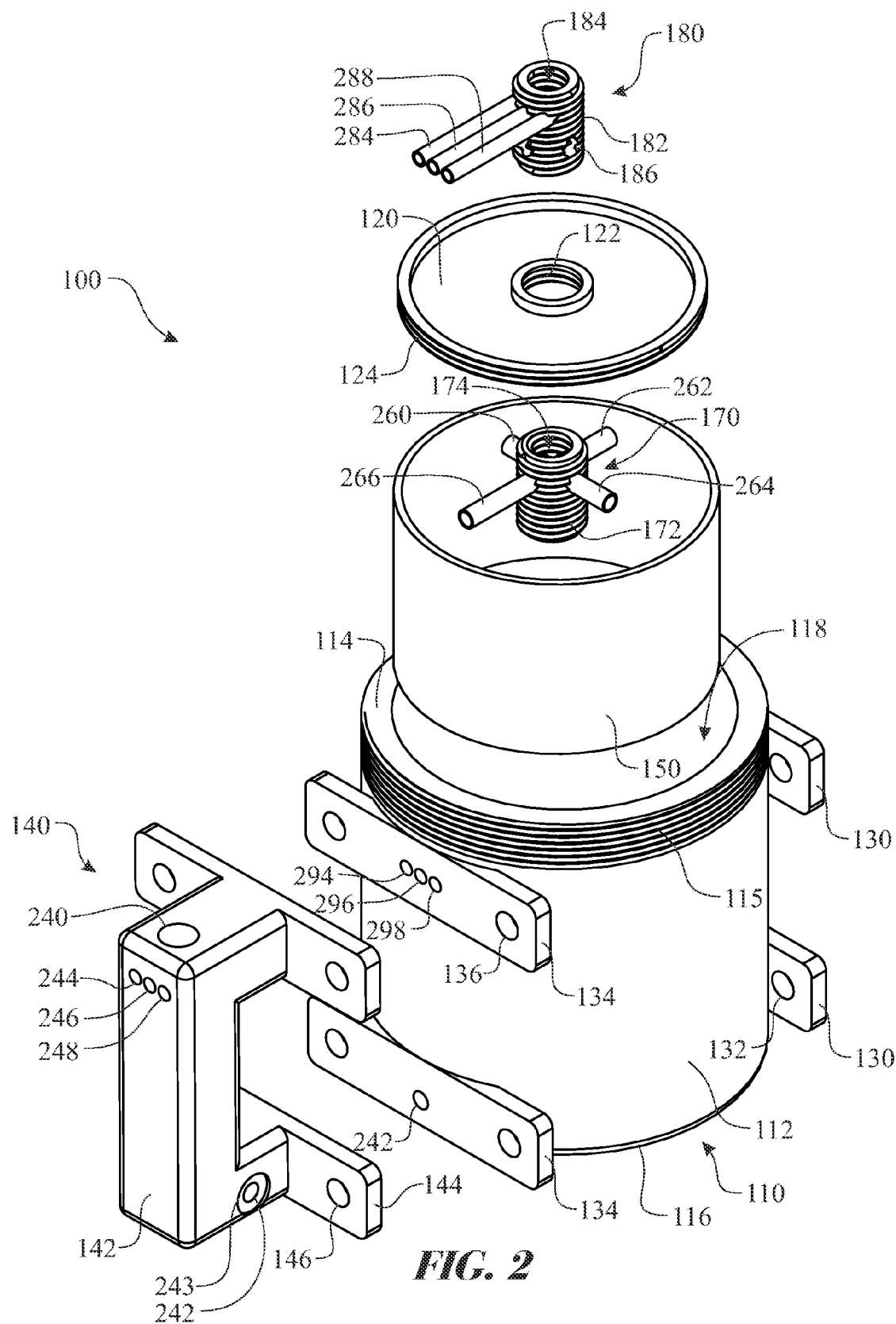
FIG. 2 presents an exploded isometric assembly view of the liquid reclamation assembly originally introduced in FIG. 1.
Figure 3:
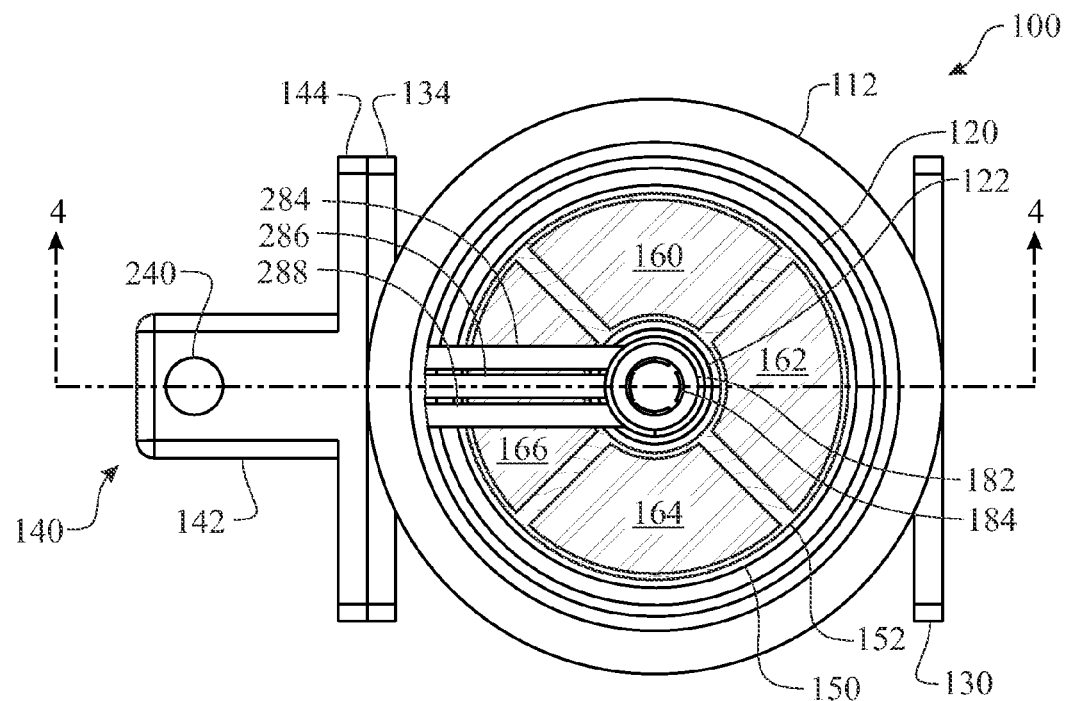
FIG. 3 presents a top view of the liquid reclamation assembly originally introduced in FIG. 1.
Figure 4:
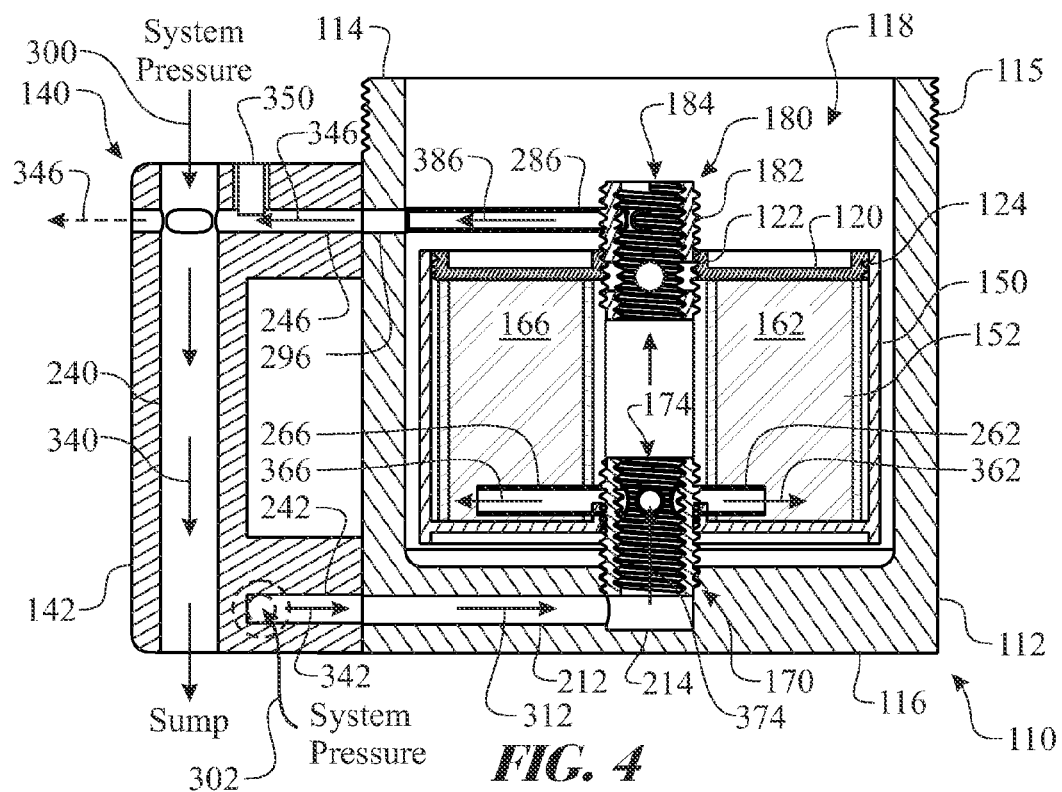
FIG. 4 presents a sectional side view of the liquid reclamation assembly originally introduced in FIG. 1, the section taken along section line 4—4 of FIG. 3.
Figure 5:
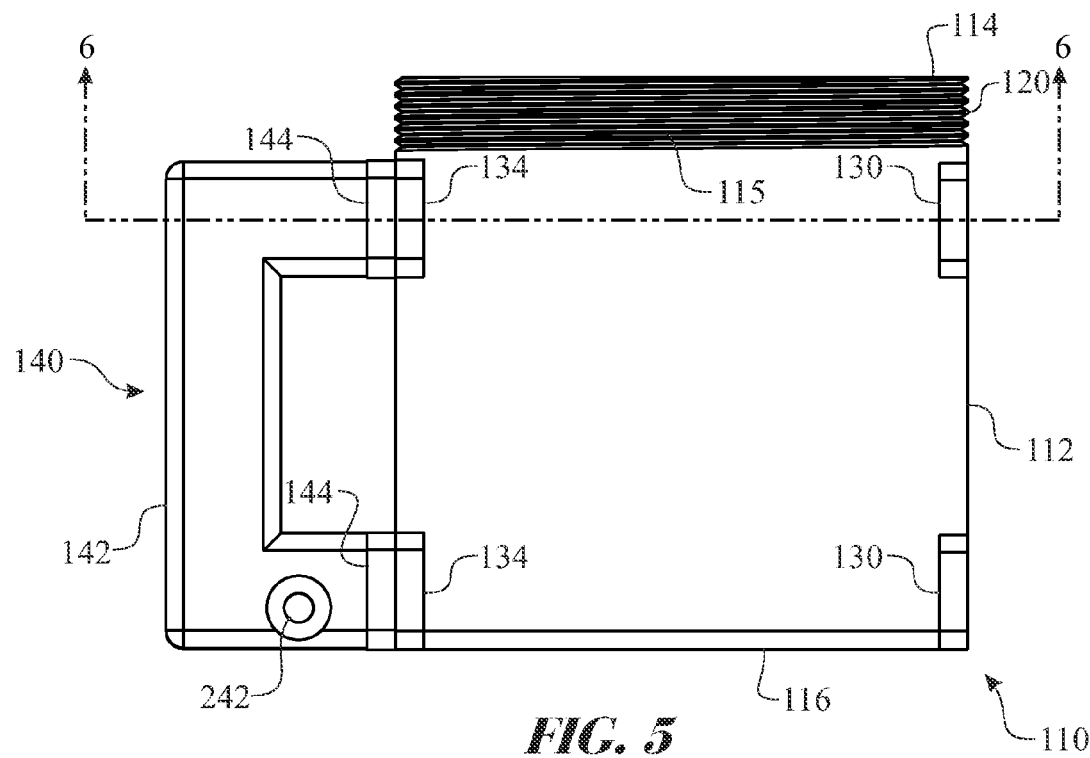
FIG. 5 presents a side elevation view of the liquid reclamation assembly originally introduced in FIG. 1.
Figure 6:
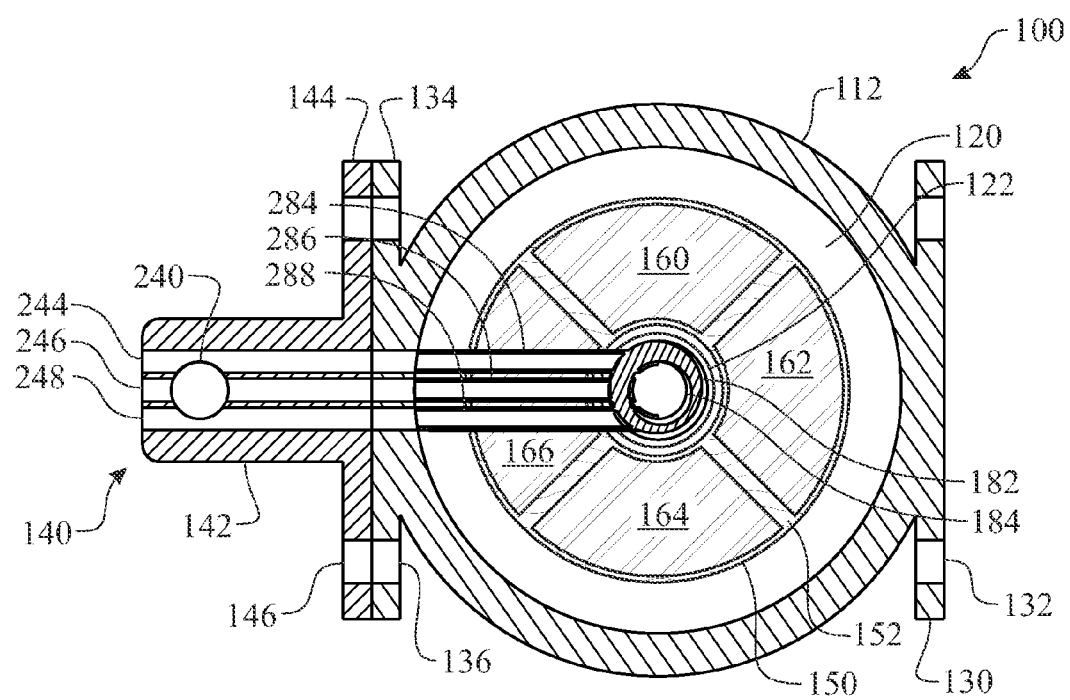
FIG. 6 presents a sectional side view of the liquid reclamation assembly originally introduced in FIG. 1, the section taken along section line 6—6 of FIG. 5.
Figure 7:
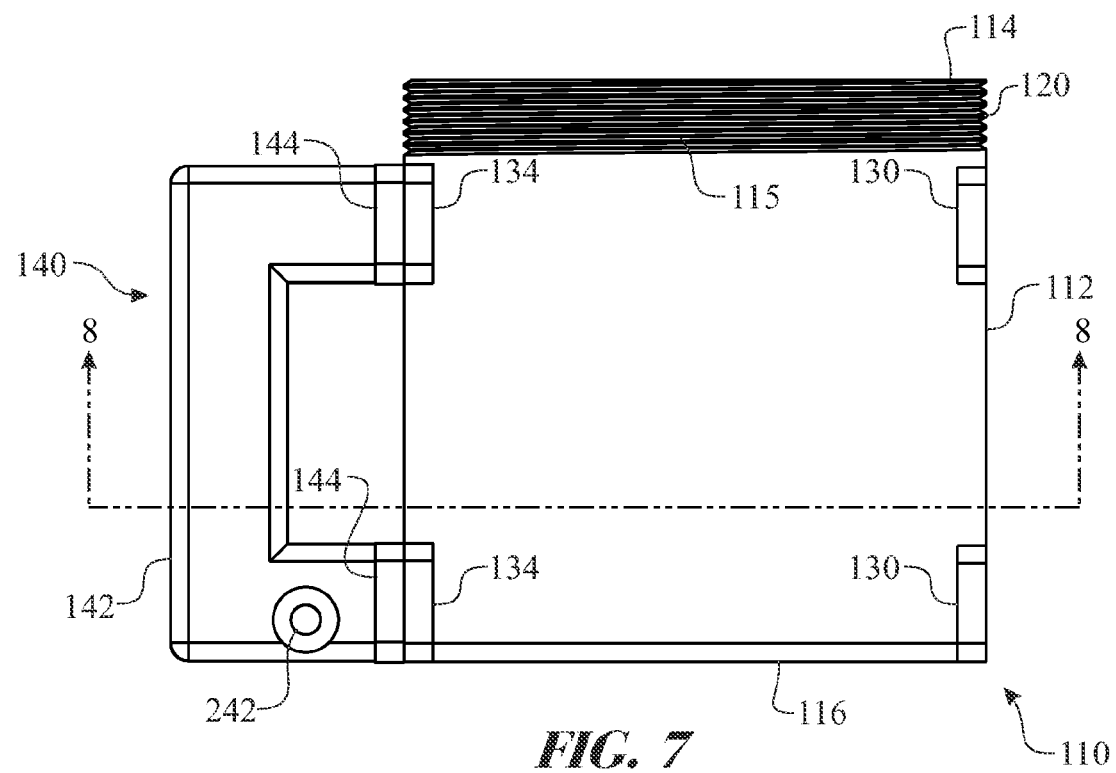
FIG. 7 presents a side elevation view of the liquid reclamation assembly originally introduced in FIG. 1.
Figure 8:
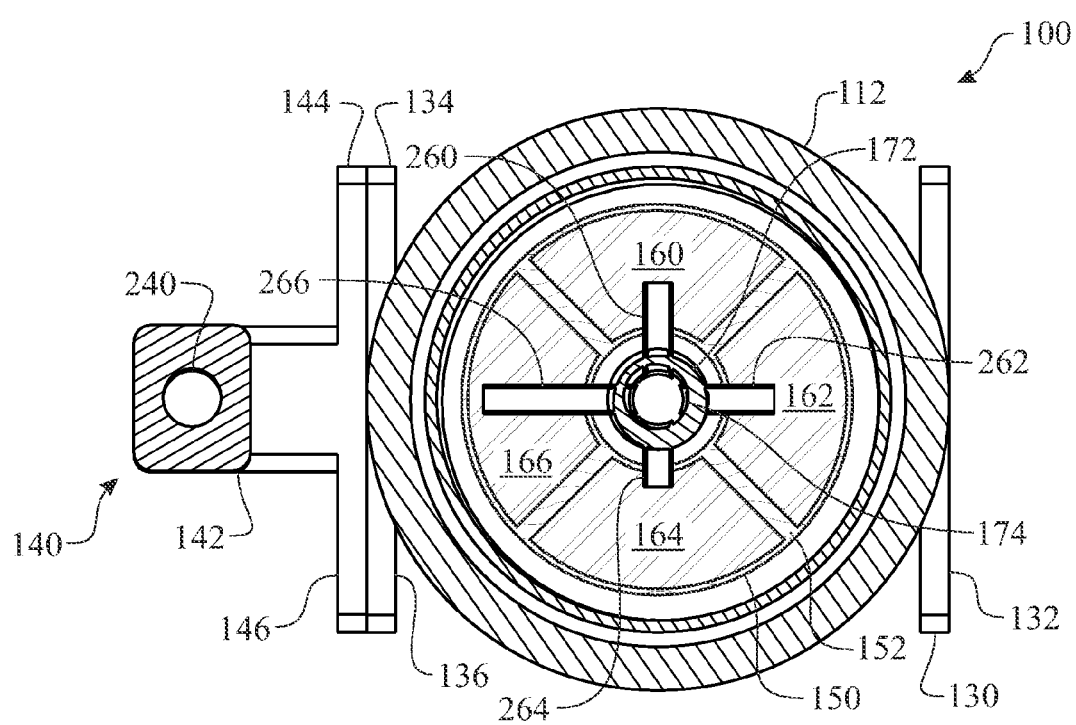
FIG. 8 presents a sectional side view of the liquid reclamation assembly originally introduced in FIG. 1, the section taken along section line 8—8 of FIG. 7.
Figure 9:
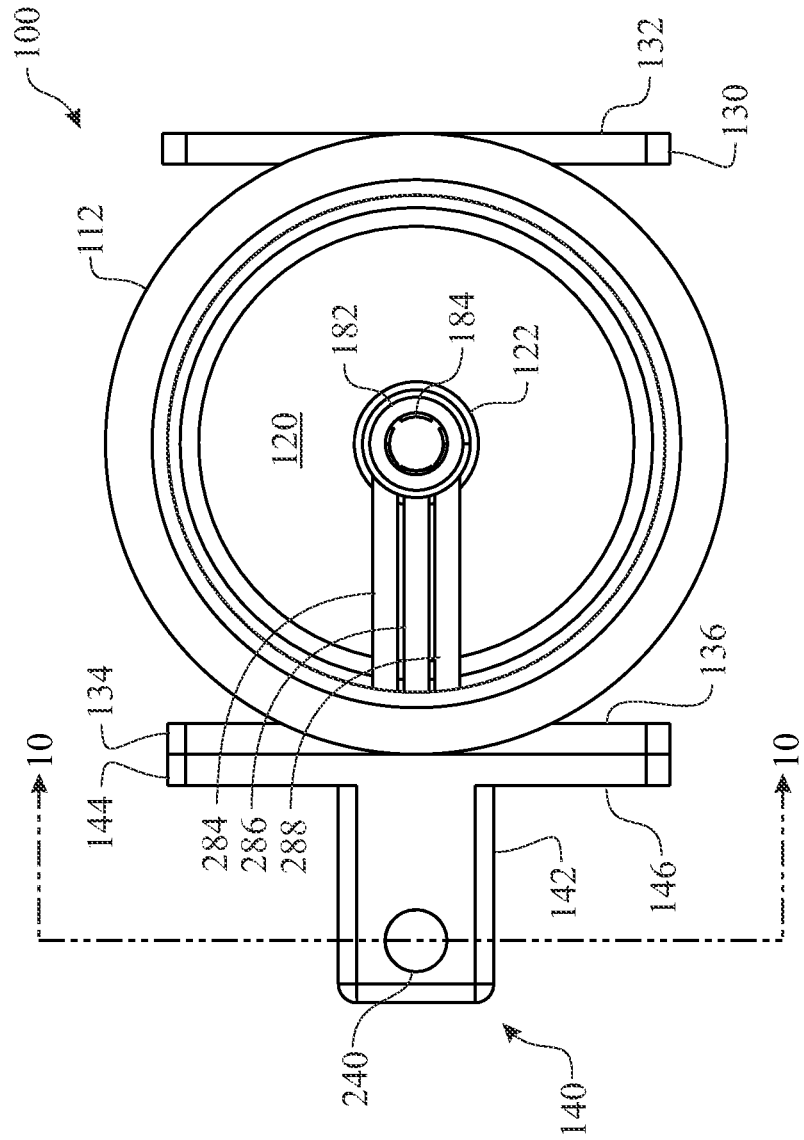
FIG. 9 presents a top view of the liquid reclamation assembly originally introduced in FIG. 1.
Figure 10:
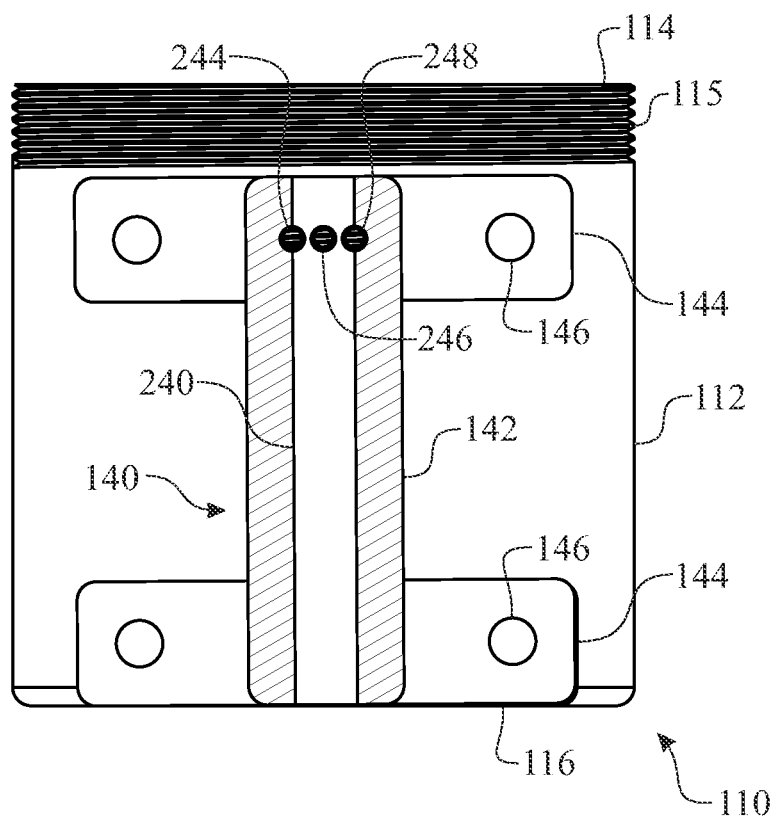
FIG. 10 presents a sectional rear view of the liquid reclamation assembly originally introduced in FIG. 1, the section taken along section line 10—10 of FIG. 9.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

An exemplary liquid reclamation assembly 100 is presented in FIGS. 1 through 10. The exemplary liquid reclamation assembly 100 provides an apparatus for treating and purifying a lubricant or other liquid passing therethrough. The liquid reclamation assembly 100 allows a user to increase the efficiency of the lubricant treatment process by directing the subject lubricant towards a specific target filtration or treatment segment 160, 162, 164, 166.

The liquid reclamation assembly 100 includes a filter housing subassembly 110 defining a housing interior 118. The housing interior 118 is defined by a tubular filter housing sidewall 112 fabricated having a tubular shape, the tubular filter housing sidewall 112 having a housing opening 114 and a base end, and a housing base 116 being contiguously integrated about a base end of the tubular filter housing sidewall 112. It is preferred that the filter housing subassembly 110 is fabricated having a unitary construction. A filter container seal interface 115 is formed about an opening edge providing a feature for attachment of a housing cover (now shown, but well understood). The filter container seal interface 115 can be fashioned in any form factor on the exterior of the tubular filter housing sidewall 112, the interior of the tubular filter housing sidewall 112, or both. The form factor of the filter container seal interface 115 can utilize a threaded interface, a quick disconnect interface, a twist and lock interface, and the like. An optional gasket or other seal forming element can be inserted between the opening edge of the tubular filter housing sidewall 112 and the housing cover.

A fluid entry path and a fluid discharge path allow passage of the subject fluid through the liquid reclamation assembly 100 for reclamation processing. A filter fluid supply conduit 212 and respective supply flow discharge adapting section 214 provides a passage for fluid to enter the housing interior 118. It is understood the filter fluid supply conduit 212 and supply flow discharge adapting section 214 are exemplary and the actual passage configuration may be formed in any reasonable and manufacturable size and shape respective to the selected application and manufacturing processes. An exemplary series of discharge conduit passages 294, 296, 298 provide passages for the subject processed fluid to exit the housing interior 118. It is understood the actual discharge conduit passages 294, 296, 298 can be of any number, include a single discharge conduit passage 296 or a plurality of discharge conduit passages 294, 296, 298 of any reasonable number.

The filter housing subassembly 110 can be fabricated using a unitary fabrication processes, including a casting process, a molding process, a machining process, a drawing process, and the like. Alternately, the filter housing subassembly 110 can be fabricated by cutting a tubular material to a predetermined length to create a tubular filter housing sidewall 112, cutting a housing base 116 to the desired shape and size to mate with a base end of the tubular filter housing sidewall 112, and contiguously attaching the tubular filter housing sidewall 112 and housing base 116 together about the base end of the tubular filter housing sidewall 112. The passages, including the filter fluid supply conduit 212 and respective supply flow discharge adapting section 214 and the series of discharge conduit passages 294, 296, 298, would be formed either in the casting or molding process or by a secondary machining process, such as drilling. Any mechanical interface features, such as the filter container seal interface 115 can be formed either in the casting or molding process or by a secondary machining process, such as a thread forming process. The filter housing subassembly 110 would be fabricated of a material selected based upon the application, the application parameters (such as temperature conditions, target fluids, vibration, target longevity, environmental conditions, and the like), manufacturing processes, desired costs, and the like.

A filter subassembly 150 is inserted into the housing interior 118 formed within the filter housing subassembly 110. The filter subassembly 150 is fabricated having a series of filtration segments. In the exemplary embodiment, the filter subassembly 150 includes a first target filtration segment 160, a second target filtration segment 162, a third target filtration segment 164, and a nth target filtration segment 166, wherein the nth target filtration segment 166 is representative of any number of additional target filtration segments. The target filtration segments 160, 162, 164, 166 can be integrated into the filter subassembly 150 or independently exchangeable. By utilizing independently exchangeable target filtration segments 160, 162, 164, 166, the system improves the cost efficiency to the end user. The end user is required to replace on the individual target filtration segment 160, 162, 164, 166 as deemed necessary, thus optimizing the usage of each of the individual target filtration segments 160, 162, 164, 166. Each individual target filtration segment 160, 162, 164, 166 can include a specific reclamation function or combination thereof, including:
  a. a lubricant additive,
  b. a moisture removal material,
  c. a pressure treatment mechanism,
  d. a filtering mechanism for removal of magnetic material,
  e. an ionic filtering mechanism, and
  f. a particulate matter filtering mechanism.

A filter compartment seal 120 is assembled to the filter housing subassembly 110 to entrap the filter subassembly 150 within the housing interior 118, as well as providing a fluid seal thereof. The filter compartment seal 120 includes a filter seal assembly interface 124 for removably attaching the filter compartment seal 120 to the filter housing subassembly 110. In the exemplary embodiment, the filter seal assembly interface 124 is formed about a peripheral edge of the filter compartment seal 120 and mechanical engages with a mating feature provided within an interior surface of the tubular filter housing sidewall 112. It is understood the filter compartment seal 120 can be replaced by or have dual functionality of the housing cover (described above).

The liquid reclamation assembly 100 includes at least one filter mounting bracket 130 for securing the liquid reclamation assembly 100 in the desired application. The filter mounting bracket 130 can be provided in any form factor. The exemplary form factor provides a pair of filter mounting brackets 130 in a bar styled mounting bracket configuration having a pair of mounting features 132, such as mechanical fastener apertures. The filter mounting bracket 130 can be integrated into a casting process or fabricated separately and subsequently attached to the filter housing subassembly 110 by a welding process, attached by mechanical fasteners, attached by an adhesive, and the like. A body to manifold attachment bracket 134 is provided for receiving each manifold to body interface bracket 144 respectively. The body to manifold attachment bracket 134 is integrated into the filter housing subassembly 110. The body to manifold attachment bracket 134 includes a plurality of manifold attachment receiving features 136, located in registration with each manifold attachment feature 146 respectively for securing each manifold to body interface bracket 144 to the mating body to manifold attachment bracket 134.

A fluid return manifold subassembly 180 provides a discharge means for removing treated fluid from the housing interior 118. The housing interior 118 includes one or more discharge conduits 284, 286, 288 assembled in fluid communication with a fluid return port 184 centrally formed through a fluid return manifold body 182. The exemplary fluid return manifold body 182 includes a mechanical interface (such as a threaded interior or exterior surface) for attachment to a filter seal discharge port 122 of the filter compartment seal 120. A plurality of return intake orifices 186 can be formed through a sidewall of the fluid return manifold body 182 to aid in removal of the treated fluid from within the housing interior 118. The inclusion, size, and location of the fluid return manifold body 182 would be determined by the designed fluid flow pattern within the filter subassembly 150. The one or more discharge conduits 284, 286, 288 are arranged to align with the respective one or more discharge conduit passages 294, 296, 298.

A manifold subassembly 140 introduces several key functions into the system. A first advantage created by the manifold subassembly 140 is where the liquid reclamation assembly 100 utilizes a venturi effect to draw treated fluid from the housing interior 118. A second advantage allows the installer the ability to obtain and analyze samples of the treated fluid to determine the effectiveness of the treatment process. The following describes the functional features of the exemplary manifold subassembly 140.

The manifold subassembly 140 includes a primary manifold passage 240 passing therethrough. The manifold subassembly 140 utilizes a manifold body 142 incorporating a series of flow channels and a connection interface. The manifold body 142 comprises a series of draw conduits 244, 246, 248, wherein each draw conduit 244, 246, 248 provides fluid communication between each respective discharge conduit passage 294, 296, 298 and the primary manifold passage 240. It is desirable where the cross sectional area of the primary manifold passage 240 is greater than the sum of the cross sectional areas of the draw conduits 244, 246, 248. Fluid, more specifically a system pressure bypass flow 300, is introduced into the primary manifold passage 240. As the system pressure bypass flow 300 flows through the primary manifold passage 240, the system pressure bypass flow 300 creates a venturi effect, drawing fluid through each draw conduit 244, 246, 248. The drawn fluid pulls a return fluid flow 386 from the fluid return manifold subassembly 180. The return fluid flow 386 continues through the exemplary discharge conduit 286, transferring into the exemplary (central) draw port 246 referenced as an exemplary (central) fluid sampling draw 346. A first fluid sampling draw 344 would be provided respective to a first draw conduit 244. Similarly, a fluid sampling draw each additional draw conduit is provided, being reference as a nth fluid sampling draw 348 respective to a nth draw port 248. The exemplary fluid sampling draw 346 proceeds to exit the manifold subassembly 140 through an orifice. The respective orifices can be located either prior or subsequent to the primary manifold passage 240. A sample analysis device 198 (FIG. 11) can be connected to each respective orifice to determine the quality of the post-processed lubricant. The sample analysis device 198 can inspect for (## check this list ##) contaminants, ionic quality, magnetic particulate matter, viscosity, and the like. The data resulting from the analysis can be used to automatically adapt the filtration flow path and resulting reclamation processing. Details of this will be presented later in this disclosure.

A filtering distribution manifold subassembly 170 is provided to distribute inbound fluid to each desired target filtration segment 160, 162, 164, 166 of the filter subassembly 150. The filtering distribution manifold subassembly 170 includes a distribution manifold body 172 forming a distribution manifold passage 174 for passage of the fluid therethrough. A series of distribution conduits, including a first distribution conduit 260, a second distribution conduit 262, a third distribution conduit 264, and a nth distribution conduit 266 provided fluid communication between the distribution manifold passage 174 and each respective target filtration segment 160, 162, 164, 166. It is understood the total number and configuration of distribution conduits would be respective to the number and position of each of the target filtration segments 160, 162, 164, 166.

A sample draw control valve 350 can be integrated into the ### each of the draw conduits 244, 246, 248. The user can configure the settings on each of the sample draw control valves 350 of the respective draw conduits 244, 246, 248 to govern the flow from the filter housing subassembly 110 to any of the variety of integrated analyzing devices. Data from the integrated analyzing devices can be used to direct the fluid to a specific portion of the inserted filter subassembly 150 for treatment as needed. Alternately, the fluid can be routed to a specific treatment apparatus for treating the fluid in accordance with a process determined by the date from the integrated analyzing devices.

A source fluid flow 342 enters the filter housing subassembly 110 through a filter inlet port 242. The source fluid flow 342 can be provided by pressure 302 within the lubricant system or be drawn by a system flow 340 causing a venturi effect to draw fluid into and through the liquid reclamation assembly 100. The source fluid flow 342 continues through a filter fluid supply conduit 212, being referenced as a filter fluid supply flow 312. The filter fluid supply flow 312 is redirected at a supply flow discharge adapting section 214 into the filtering distribution manifold subassembly 170. The filtering distribution manifold subassembly 170 distributes the source fluid into each of the target filtration segments 160, 162, 164, 166 via a plurality of distribution conduits 260, 262, 264, 266. The distributed fluid is injected into each respective target filtration segments 160, 162, 164, 166 identified as a discharge fluid flow 362, 366. Those skilled in the art recognize that the distribution conduits 260, 262, 264, 266 can be arranged in any reasonable configuration to mate with the respective target filtration segments 160, 162, 164, 166. A valve (not shown, but well understood) may be integrated within each of the distribution conduits 260, 262, 264, 266 for controlling fluid flow into each respective target filtration segment 160, 162, 164, 166.

The fluid passes through one or more of the target filtration segments 160, 162, 164, 166; discharges into the general filter material 152 and is collected and discharged through elements of a fluid return manifold subassembly 180. Fluid enters a fluid return manifold body 182 of the fluid return manifold subassembly 180 through any orifice provided in fluid communication with the filter subassembly 150. The discharge conduits 284, 286, 288 are in fluid communication with a fluid passage within an interior of the fluid return manifold body 182. The discharge conduits 284, 286, 288 provide fluid communication between the fluid return manifold body 182 and the draw conduits 244, 246, 248.

Figure 11:
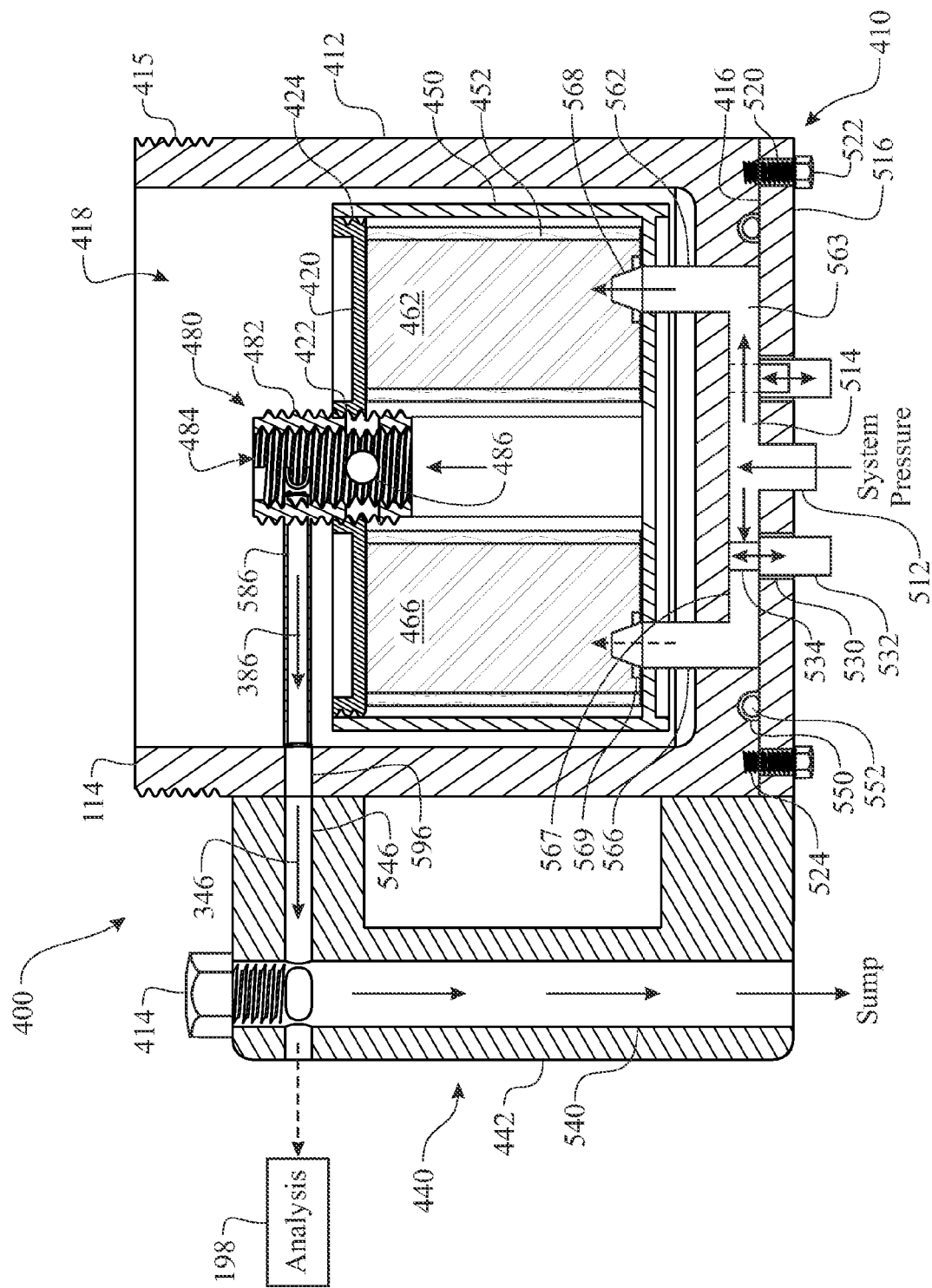
FIG. 11 presents a side sectional view of an alternate embodiment of the present invention, introducing a filtering distribution manifold subassembly which is integrated into a housing base.
Figure 12:
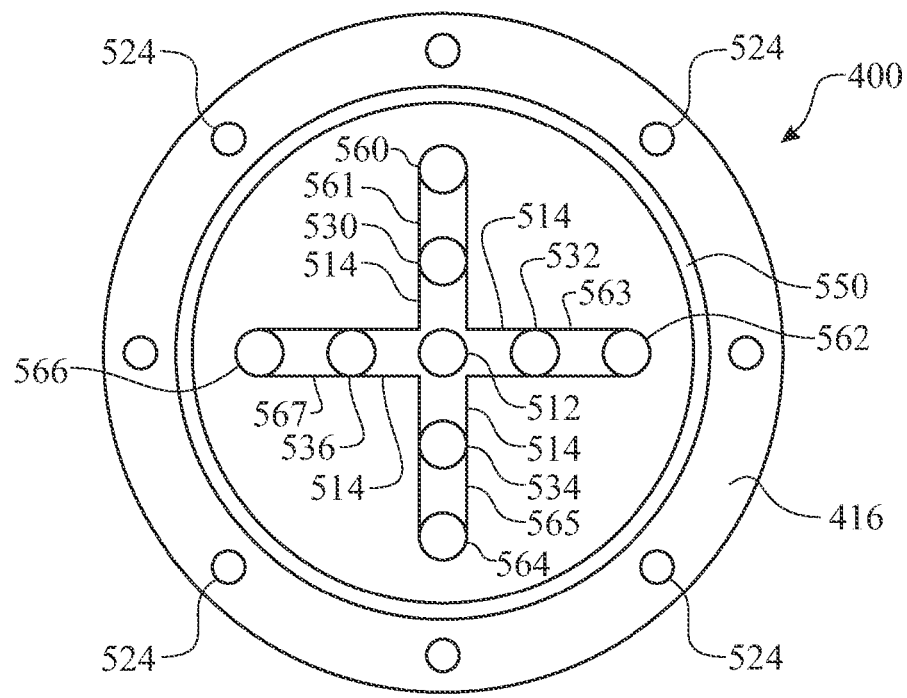
FIG. 12 presents an exemplary bottom view of the housing base detailing elements of the integrated filtering distribution manifold subassembly.
Figure 13:
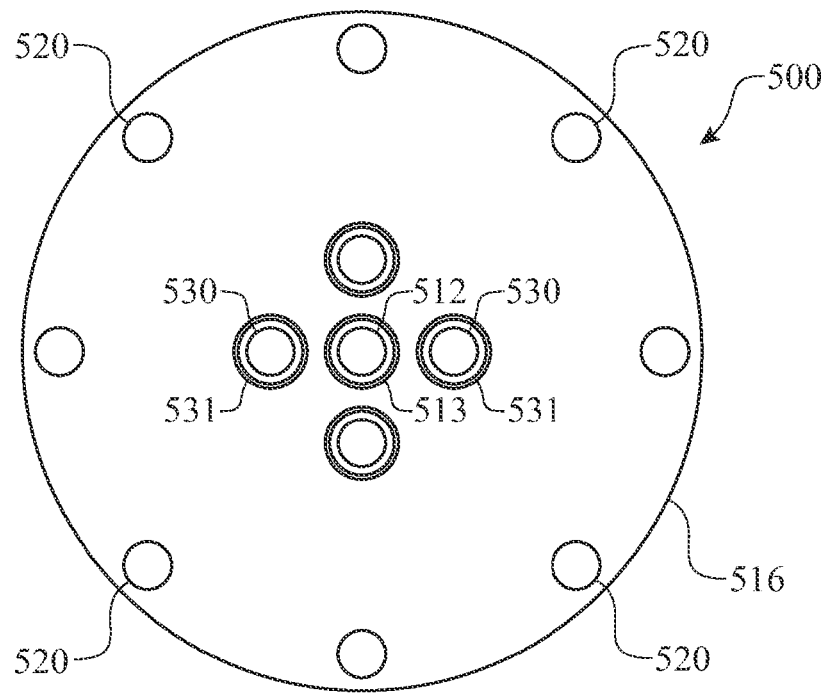
FIG. 13 presents an exemplary top view of a base seal assembly, which provides a seal for the integrated filtering distribution manifold subassembly.

A second exemplary embodiment is presented in FIGS. 11 through 13. The second exemplary embodiment comprises a number of features similar to those presented in the first exemplary embodiment of FIGS. 1 through 10. Like features of integrated distribution manifold filter assembly 400 and liquid reclamation assembly 100 are numbered the same except preceded by the numeral '4', with similar continued elements preceded by the numeral '2' are numbered the same except preceded by the numeral '5'. Functional elements of the filtering distribution manifold subassembly 170 of the first exemplary embodiment are integrated into a base portion of the filter housing subassembly 410. A manifold arrangement is provided within the base portion of the filter housing subassembly 410 to acquire, govern, and distribute fluid supplied by a system pressure to each of the directed flow delivery conduits 560, 562, 564, 566. Suspect fluid enters the manifold arrangement through a base inlet passage 512. The base inlet passage 512 can be formed through a filter base seal 516. The base inlet passage 512 is in fluid communication with a discharge distribution arrangement 514. The fluid passes through the base inlet passage 512 and is distributed within the discharge distribution arrangement 514 and directed towards each of a plurality of directed flow channels 561, 563, 565, 567. The manifold arrangement includes a plurality of directed flow delivery conduits 560, 562, 564, 566, wherein each directed flow delivery conduit 560, 562, 564, 566 extends upward providing fluid engagement with each respective target filtration segment 460, 462, 464, 466. Each of the directed flow delivery conduits 560, 562, 564, 566 may include a tapered end for aid in insertion into the base portion of the respective target filtration segments 460, 462, 464, 466. A series of actuator passages 530 are formed through the filter base seal 516. Each actuator passage 530 is located in relation to the distal end of each channel of the discharge distribution arrangement 514 to control fluid flow across a transition between the distal end of each channel of discharge distribution arrangement 514 and each respective directed flow delivery conduit 560, 562, 564, 566. A flow controlling actuator 532 is operatively engaged with a flow controlling valve 534. The assembly comprising the flow controlling actuator 532 and flow controlling valve 534 is one exemplary embodiment being representative of a flow control device. The flow controlling actuator 532 can be any actuator known by those skilled in the art. The flow controlling actuator 532 is assembled respective to each actuator passage 530, where the flow controlling valve 534 is positioned to control the flow of the fluid to the desired directed flow delivery conduit 560, 562, 564, 566. A fluid transfer interface member 568 is provided at a discharge transfer end of each of the directed flow delivery conduits 560, 562, 564, 566. The fluid transfer interface member 568 is preferably conically shaped for injection into a mating port 569 provide in a bottom surface of the filter subassembly 450. The mating port 569 may be provided as a flexible gasket material, such as a rubber, silicone, and the like to provide a fluid seal therebetween. The flow controlling valve 534 is shown in an open configuration adjacent to the second directed flow channel 563. The flow controlling valve 534 is shown in a sealed configuration adjacent to the nth directed flow channel 567. The analytical system determines which of the target filtration segments 460, 462, 464, 466 are necessary to process the fluid and opens the respective flow controlling valve 534. A seal channel 550 is formed within the base end of the unitary housing member 416 (as shown) or a contacting surface of the filter base seal 516 (as well understood). A seal 552 is inserted into the seal channel 550 to provide a seal between the base end of the unitary housing member 416 and the filter base seal 516. The seal channel 550 is sized where a portion of the seal 552 extends outward therefrom to ensure a proper fluid seal between the base end of the unitary housing member 416 and the filter base seal 516. Similarly, a base inlet passage seal 513 provides a seal about the base inlet passage 512 and an actuator passage seal 531 provides a seal about each actuator passage 530. A plurality of attachment apertures 520 is formed through the filter base seal 516. A plurality of fastener engaging features 524 are formed within a lower end of the filter housing subassembly 410, each fastener engaging feature 524 is located in registration with each respective attachment aperture 520. A fastener 522 is inserted through the attachment aperture 520 and threaded into the fastener engaging feature 524, securing the filter base seal 516 to the base end of the unitary housing member 416.

In operation, a system pressure directs fluid into the base inlet passage 512. Results determined by the sample analysis device 198 would determine the optimal reclamation processing for the fluid. The system is programmed to identify which flow controlling actuator 532 is associated with each respective target filtration segment 460, 462, 464, 466. Each of the respective target filtration segment 460, 462, 464, 466 is identified for its respective reclamation functions. The result of the sample analysis device 198 determines the desired reclamation functions and thus determines which the respective target filtration segment 460, 462, 464, 466 are to be used for processing the fluid. The system then determines which of the series of flow controlling actuators 532 are to be configured in a fluid passage (open) configuration and which of the series of flow controlling actuators 532 are to be configured in a fluid blockage (sealed) configuration and actuates them accordingly. The fluid flows past the open flow controlling valve(s) 534 and into the respective target filtration segment 460, 462, 464, 466 for processing. The fluid preferably continues through a general filter material 452. A fluid return manifold subassembly 480 is provided to collect and return the fluid to the system. The fluid return manifold subassembly 480 includes a fluid return manifold body 482, which defines a fluid return port 484. The processed fluid is collected and enters the fluid return port 484 through an orifice at a base of a fluid return manifold body 482 and/or through a return intake orifice 486. The reclaimed fluid is returned to the system through at least one discharge conduit 586 illustrated by an arrow representative of return fluid flow 386. The return fluid flow 386 can result from either pressure provided by the inlet system flow or be drawn out by a venturi effect created by a system flow through a manifold body 442. The manifold body 442 is provided in fluid communication with each of an at least one draw port 546, wherein each draw port 546 are in fluid communication with a respective at least one discharge conduit 586. The cross sectional area of the manifold body 442 is greater than the effective cross sectional area of the sum of the at least one draw port 546, thus creating the venturi effect to draw the fluid from the housing interior 418. Where inlet pressure is utilised to solely drive the fluid through the filter housing subassembly 410, a plug 414 can be inserted into an inlet orifice of the manifold body 442.

The integrated distribution manifold filter assembly 400 enables a system to be customized to target a specific or multiple specific reclamation processes for a treatment of a lubricant or other liquid.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

We claim:

1. A lubricant reclamation system, the reclamation system comprising:
   a filter housing subassembly, the filter housing subassembly including:
      a filter housing defined by a tubular wall having a base end and an access end and a housing base being contiguous about the wall base end, the tubular wall and base end collectively defining an interior portion of the filter housing,
      a filter inlet port providing fluid communication into the interior portion of the filter housing,
      a filter discharge port providing fluid communication from the interior portion of the filter housing,
      a filter compartment seal providing a seal to enclose at least a portion of the filter housing;
   a filtering distribution manifold subassembly, the filtering distribution manifold subassembly including:
      an inlet passage, the inlet passage in fluid communication with the filter inlet port,
      a plurality of distribution conduits, each distribution conduit providing fluid communication from the inlet passage to a respective target filtration segment of a filter subassembly; and
   a fluid draw manifold assembly, said fluid draw manifold assembly comprising:
      a primary manifold passage comprising a primary manifold passage cross sectional area, said primary manifold passage in fluid communication with lubricant system flow;
      at least one lubricant draw conduit, each said draw conduit having a draw conduit cross sectional area, each said draw conduit in fluid communication with said primary manifold passage; and
   at least one discharge conduit providing a passage for fluid to exit from said discharge port and each of said at least one draw conduit,
   wherein lubricant passing through said primary manifold passage draws lubricant from said filter housing subassembly by a venturi effect.

2. A lubricant reclamation system as recited in claim 1, the lubricant reclamation system, the reclamation system further comprising:
 at least one flow control device, wherein each of at least one flow control device being integrated between said inlet passage and each of said distribution conduit.

3. A lubricant reclamation system as recited in claim 2, the lubricant reclamation system, the reclamation system further comprising:
 said filter subassembly comprising a plurality of target filtration segments, wherein at least two of said target filtration segments comprises different fluid reclamation processes; and
 a fluid analysis system which obtains a sample of lubricant from a lubricant system, wherein the fluid analysis system completes an analysis of the lubricant and determines and controls the status of each of said at least one flow control device into one of a flow through or a blocked flow configuration to direct flow of lubricant into a predetermined set of target filtration segments.

4. A lubricant reclamation system as recited in claim 1, the lubricant reclamation system, the reclamation system further comprising:
 a fluid analysis system which obtains a sample of lubricant from a lubricant system, wherein the fluid analysis system completes an analysis of the lubricant and determines and controls the status of each of said at least one flow control device into one of a flow through or a blocked flow configuration to direct flow of lubricant into a predetermined set of target filtration segments.

5. A lubricant reclamation system as recited in claim 1, the lubricant reclamation system, the reclamation system further comprising:
 a fluid analysis system which obtains a sample of lubricant from at least one of said at least one lubricant draw conduit, wherein the fluid analysis system completes an analysis of the lubricant and determines and controls the status of each of said at least one flow control device into one of a flow through or a blocked flow configuration to direct flow of lubricant into a predetermined set of target filtration segments.

6. A lubricant reclamation system, the reclamation system comprising:
 a filter housing subassembly, the filter housing subassembly including:
  a filter housing defined by a tubular wall having a base end and an access end and a housing base being contiguous about the wall base end,
  a filter inlet port providing fluid communication into an interior portion of the filter housing,
  a filter discharge port providing fluid communication from an interior portion of the filter housing,
  a filter compartment seal providing a seal to enclose at least a portion of the filter housing; and
 a fluid draw manifold assembly, said fluid draw manifold assembly comprising:
  a primary manifold passage comprising a primary manifold passage cross sectional area, said primary manifold passage in fluid communication with lubricant system flow;
  at least one lubricant draw conduit, each said draw conduit having a draw conduit cross sectional area, each said draw conduit in fluid communication with said primary manifold passage;
  at least one discharge conduit providing a passage for fluid to exit from said discharge port and each of said at least one draw conduit;
 a filter subassembly comprising at least one filter inlet port, a filter discharge port, and a plurality of target filtration segments, wherein at least two of said target filtration segments comprises different fluid reclamation processes; and
 a filtering distribution manifold subassembly, the filtering distribution manifold subassembly including:
  an inlet passage, the inlet passage in fluid communication with said at least one filter inlet port,
  a plurality of distribution conduits, each distribution conduit providing fluid communication between said inlet passage to a respective target filtration segment of said plurality of target filtration segments.

7. A lubricant reclamation system as recited in claim 6, the lubricant reclamation system, the reclamation system further comprising:
 a fluid analysis system that obtains a sample of lubricant from a lubricant system.

8. A lubricant reclamation system as recited in claim 6, the lubricant reclamation system, the reclamation system further comprising:
 a fluid analysis system that obtains a sample of lubricant from at least one of said at least one lubricant draw conduit.

9. A lubricant reclamation system as recited in claim 6, the lubricant reclamation system, the reclamation system further comprising:
 a flow control device integrated with each said at least one lubricant draw conduit, wherein said flow control device governs fluid flow between said at least one draw conduit and said primary manifold passage.

10. A lubricant reclamation system as recited in claim 9, the lubricant reclamation system, the reclamation system further comprising:
 a fluid analysis system that obtains a sample of lubricant from at least one of said at least one lubricant draw conduit.

11. A lubricant reclamation system as recited in claim 6, the lubricant reclamation system, the reclamation system further comprising:
 wherein each target filtration segment comprises a filter inlet port, respectively.

12. A lubricant reclamation system, the reclamation system comprising:
 a filter housing subassembly, the filter housing subassembly including:
  a filter housing defined by a tubular wall having a base end and an access end and a housing base being contiguous about the wall base end,
  a filter inlet port providing fluid communication into an interior portion of the filter housing,
  a filter discharge port providing fluid communication from an interior portion of the filter housing,
  a filter compartment seal providing a seal to enclose at least a portion of the filter housing; and
 a fluid draw manifold assembly, said fluid draw manifold assembly comprising:
  a primary manifold passage comprising a primary manifold passage cross sectional area, said primary manifold passage in fluid communication with lubricant system flow;
  at least one lubricant draw conduit, each said draw conduit having a draw conduit cross sectional area, each said draw conduit in fluid communication with said primary manifold passage; and at least one discharge conduit providing a passage for fluid to exit from said discharge port and each of said at least one draw conduit;

a filter subassembly comprising at least one filter inlet port, a filter discharge port, and a plurality of target filtration segments, wherein at least two of said target filtration segments comprises different fluid reclamation processes; and a filtering distribution manifold subassembly, the filtering distribution manifold subassembly including:
- an inlet passage, the inlet passage in fluid communication with said at least one filter inlet port,
- a plurality of distribution conduits, each distribution conduit providing fluid communication between said inlet passage to a respective target filtration segment of said plurality of target filtration segments; and
- at least one flow control device, wherein each of at least one flow control device being integrated between said inlet passage and each of said distribution conduit.

13. A lubricant reclamation system as recited in claim 12, the lubricant reclamation system, the reclamation system further comprising:
a fluid analysis system which obtains a sample of lubricant from a lubricant system, wherein the fluid analysis system completes an analysis of the lubricant and determines and controls the status of each of said at least one flow control device into one of a flow through or a blocked flow configuration to direct flow of lubricant into a predetermined set of target filtration segments.

14. A lubricant reclamation system as recited in claim 12, the lubricant reclamation system, the reclamation system further comprising:
a fluid analysis system which obtains a sample of lubricant from at least one of said at least one lubricant draw conduit, wherein the fluid analysis system completes an analysis of the lubricant and determines and controls the status of each of said at least one flow control device into one of a flow through or a blocked flow configuration to direct flow of lubricant into a predetermined set of target filtration segments.

15. A lubricant reclamation system as recited in claim 12, wherein the filtering distribution manifold subassembly is integrated into a base of the filter housing subassembly.

16. A lubricant reclamation system as recited in claim 15, the distribution conduits further comprising a segment being oriented parallel to an insertion axis of said filter subassembly.

17. A lubricant reclamation system as recited in claim 16, the distribution conduits further comprising a fluid transfer interface member, said fluid transfer interface member having a tapered end for insertion into a respective target filtration segment.

18. A lubricant reclamation system, the reclamation system comprising:
a filter housing subassembly, the filter housing subassembly including:
- a filter housing defined by a tubular wall having a base end and an access end and a housing base being contiguous about the wall base end, the tubular wall and base end collectively defining an interior portion of the filter enclosure,
- a filter inlet port providing fluid communication into the interior portion of the filter housing,
- a filter discharge port providing fluid communication from the interior portion of the filter housing,
- a filter compartment seal providing a seal to enclose at least a portion of the filter housing;

a filtering distribution manifold subassembly, the filtering distribution manifold subassembly including:
- an inlet passage, the inlet passage in fluid communication with the filter inlet port,
- a plurality of distribution conduits, each distribution conduit providing fluid communication from the inlet passage to a respective target filtration segment of a filter subassembly;

at least one flow control device, wherein each of at least one flow control device being integrated between said inlet passage and each of said distribution conduit;

a filter subassembly comprising a plurality of target filtration segments, wherein at least two of said target filtration segments comprises different fluid reclamation processes; and a fluid analysis system which obtains a sample of lubricant from a lubricant system, wherein the fluid analysis system completes an analysis of the lubricant and determines and controls the status of each of said at least one flow control device into one of a flow through or a blocked flow configuration to direct flow of lubricant into a predetermined set of target filtration segments.

* * * * *